United States Patent Office.

LEONARD S. BEALS, OF LONG ISLAND CITY, NEW YORK, ASSIGNOR TO THE CEROXYLON COMPANY, OF SAME PLACE.

PREPARING PYROXYLINE.

SPECIFICATION forming part of Letters Patent No. 239,424, dated March 29, 1881.

Application filed October 5, 1880. (No specimens.)

*To all whom it may concern:*

Be it known that I, LEONARD S. BEALS, a citizen of the United States, residing at Long Island City, in the county of Queens and State of New York, have invented certain new and useful Improvements in Preparing Pyroxyline; and I do hereby declare the following to be a full, clear, and exact description of the invention, such as will enable others skilled in the art to which it appertains to make and use the same.

This invention relates to the treatment of pyroxyline, xyloidine, nitro-cellulose, or that substance derived from ligneous or vegetable fibers, starch, or sugar which has been treated with suitable acids, and is known as "soluble pyroxyline."

The invention consists in the use of paraffine in combination with a certain compound solvent, hereinafter more fully set forth, by which the pyroxyline is rendered more plastic.

In carrying out my invention I dissolve the pyroxyline in a compound of mirbane, essential oil of lavender, benzole, and either methylic or ordinary alcohol, or both. I have found the proportions set forth in the following recipes to produce the best effects: first, five parts mirbane, five parts essential oil of lavender, fifty-five parts benzole, thirty-five parts methylic alcohol—total, one hundred parts; second, five parts mirbane, five parts essential oil of lavender, fifty-five parts benzole, thirty-five parts alcohol—total, one hundred parts; third, five parts mirbane, five parts essential oil of lavender, thirty parts benzole, thirty parts methylic alcohol, thirty parts alcohol—total, one hundred parts. Either of the above compounds will be found to be a superior solvent of soluble pyroxyline, or a mixture of two or more thereof may be used with advantage; or the proportion of the ingredients may be varied according to the use to which the softened or dissolved pyroxyline is to be afterward applied.

In using these compounds I take of soluble pyroxyline one hundred parts and add thereto about two hundred parts of either of the above-named solvents alone, or of two or more thereof combined, or sufficient of them to dissolve or soften the pyroxyline into a pasty mass. The solution may be effected when the materials are cold; but to hasten the solution a moderate degree of heat may be applied—say 150° or 200° Fahrenheit—with advantage. To each one hundred parts of the pasty mass thus formed about ten parts of paraffine should be added; but before the addition the latter may be dissolved, preferably in the oil of lavender or mirbane, or a mixture of both, or in any other suitable solvent; but this is not essential. The whole should then be intimately mixed, with or without further incorporation of pigments or other material, by any mechanical means, (grinding between heated rollers preferred,) as is well understood by persons conversant with the art, in order to thoroughly incorporate all the mixture and evaporate the solvents.

The above proportion is found to be useful; but I do not confine myself to the exact quantities, as the ingredients may be varied to suit the objects to which the plastic compound is to be afterward applied.

By the use of the above-described compound solvents, in about the proportions specified, and the further use of paraffine, the preparation of the pyroxyline is greatly facilitated, and the shrinkage and warping caused by the use of camphor avoided.

I am aware that it has before been proposed to mix non-volatile solvents and paraffine with pyroxyline, and therefore do not claim, broadly, the use of paraffine in pyroxyline compounds. Such use of paraffine, however, is not an equivalent of my invention, as the greasy nature of the solvents heretofore employed with paraffine is very objectionable; whereas, when paraffine is employed in connection with my compound solvents, the mirbane and essential oil of lavender combine with the paraffine, forming a fixed mobile compound which is very useful in keeping the pyroxyline compound permanently plastic under the influence of heat.

What I claim as new is—

1. The process herein described of treating pyroxyline and similar substances, consisting in dissolving them in a compound of mirbane, essential oil of lavender, benzole, and alcohol, and adding paraffine to render them plastic, substantially as described.

2. The process herein described of treating soluble pyroxyline and similar substances, consisting in rendering the same permanently plastic under heat by mixing therewith paraffine dissolved in mirbane and the essential oil of lavender, substantially as specified.

In testimony whereof I affix my signature in presence of two witnesses.

LEONARD S. BEALS.

Witnesses:
DANIEL P. MAHONY,
EDGAR J. NATHAN.